United States Patent
Yamaguchi

(10) Patent No.: US 10,386,649 B2
(45) Date of Patent: Aug. 20, 2019

(54) OPTICAL APPARATUS AND IMAGE PICKUP APPARATUS

(71) Applicant: CANON KABUSHIKI KAISHA, Tokyo (JP)

(72) Inventor: Yutaka Yamaguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 454 days.

(21) Appl. No.: 15/013,101

(22) Filed: Feb. 2, 2016

(65) Prior Publication Data

US 2016/0231582 A1    Aug. 11, 2016

(30) Foreign Application Priority Data

Feb. 9, 2015 (JP) ................................. 2015-022960

(51) Int. Cl.
*G02B 5/30* (2006.01)
*G02B 27/28* (2006.01)
*H04N 5/225* (2006.01)

(52) U.S. Cl.
CPC ......... *G02B 27/286* (2013.01); *H04N 5/2254* (2013.01); *G02F 2203/50* (2013.01)

(58) Field of Classification Search
CPC ...... G02B 5/3083; G02B 1/04; G02B 5/3033; G02B 5/305; G02B 1/08; G02B 5/3025; G02B 5/32; G02B 27/26; G02B 27/286; G02B 1/14; G02B 1/105; G02F 1/13363; C08L 1/12
See application file for complete search history.

(56) References Cited

U.S. PATENT DOCUMENTS

| | | | | |
|---|---|---|---|---|
| 5,396,329 A | * | 3/1995 | Kalawsky | G01J 4/00 250/225 |
| 5,557,261 A | * | 9/1996 | Barbour | G01N 21/21 244/134 F |
| 5,890,095 A | * | 3/1999 | Barbour | G01J 5/58 250/341.3 |
| 9,064,763 B2 | | 6/2015 | Ozawa et al. | |

(Continued)

FOREIGN PATENT DOCUMENTS

| | | |
|---|---|---|
| JP | 07064048 A | 3/1995 |
| JP | 2005316444 A | 11/2005 |

(Continued)

*Primary Examiner* — William R Alexander
*Assistant Examiner* — Tamara Y. Washington
(74) *Attorney, Agent, or Firm* — Rossi, Kimms & McDowell LLP

(57) ABSTRACT

An optical apparatus includes a first phase plate which gives a fixed relative phase difference by π/2 between a polarization component in a slow axis direction and a polarization component in a fast axis direction, a second phase plate which gives a relative phase difference between a polarization component in a slow axis direction and a polarization component in a fast axis direction, a polarizer which extracts a polarization component to be guided to the image pickup element, and a setter which sets the relative phase difference of the second phase plate, the slow axis direction of the second phase plate is inclined with respect to each of the slow and fast axes directions of the first phase plate, and the setter sets the relative phase difference of the second phase plate depending on the polarization component of light.

16 Claims, 8 Drawing Sheets

(56) References Cited

U.S. PATENT DOCUMENTS

| | | | |
|---|---|---|---|
| 2009/0079982 A1 | 3/2009 | Lefaudeux | |
| 2009/0237662 A1* | 9/2009 | Chang | G01J 4/04 356/364 |
| 2010/0039646 A1* | 2/2010 | Bourderionnet | G01J 4/04 356/367 |
| 2012/0026297 A1* | 2/2012 | Sato | G03B 35/08 348/47 |
| 2012/0154621 A1* | 6/2012 | Kuo | G02B 27/283 348/222.1 |

FOREIGN PATENT DOCUMENTS

| | | | |
|---|---|---|---|
| JP | 2010121935 A | 6/2010 |
| JP | 2010124011 A | 6/2010 |
| JP | 2012080065 A | 4/2012 |

\* cited by examiner

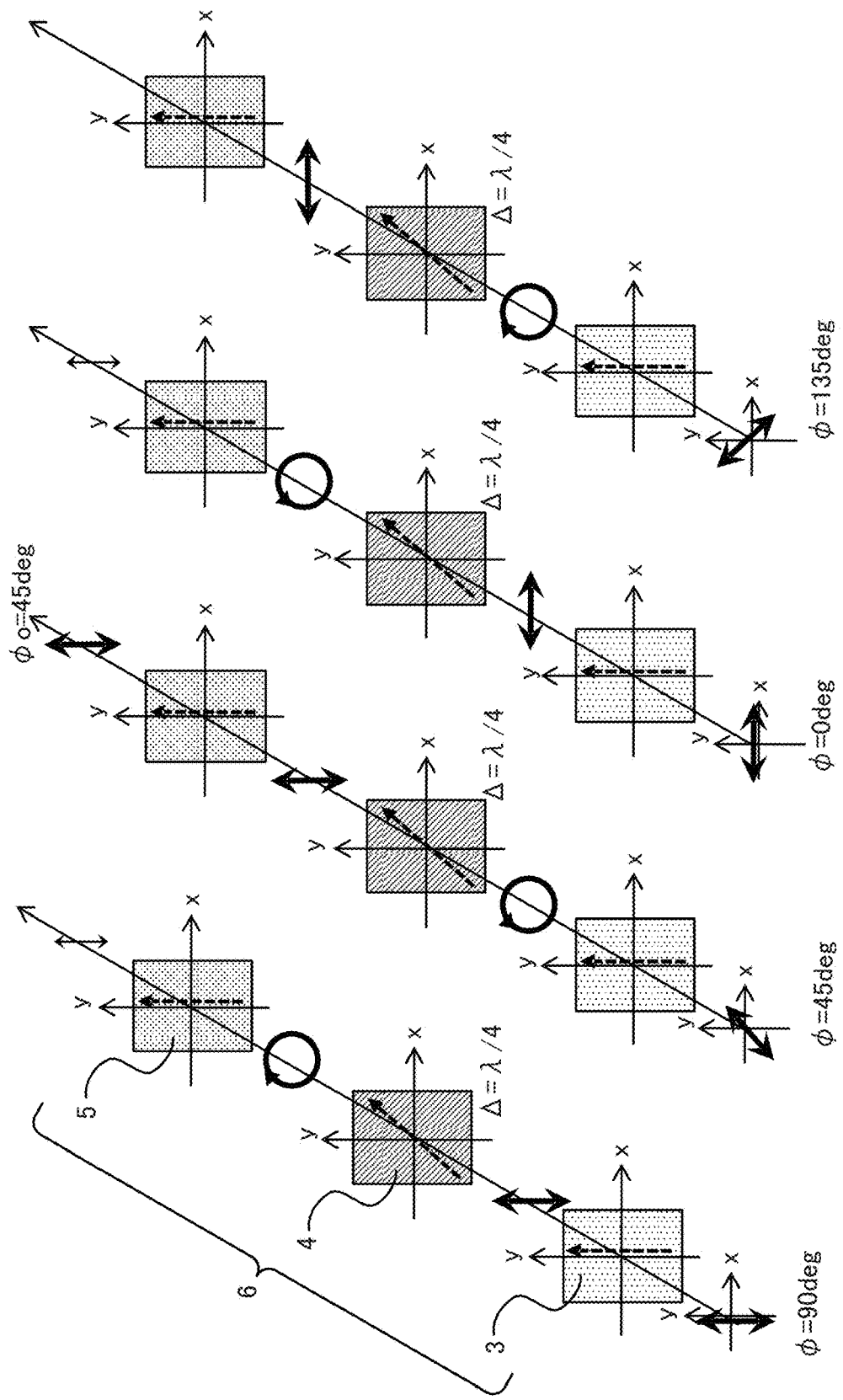

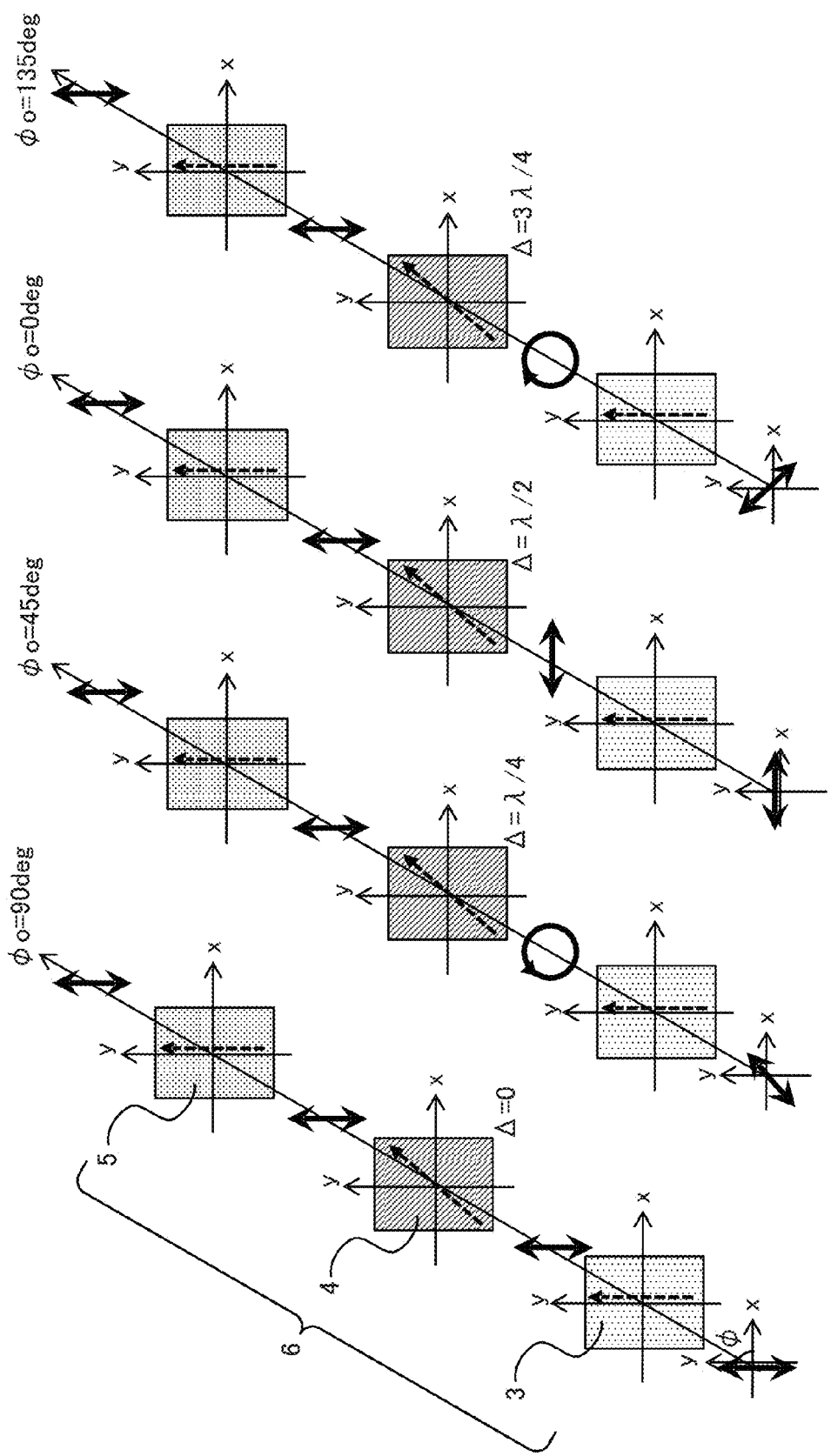

OPTICAL APPARATUS AND IMAGE PICKUP APPARATUS

BACKGROUND OF THE INVENTION

Field of the Invention

The present invention relates to an optical apparatus and an image pickup apparatus, and more particularly to an optical apparatus capable of acquiring polarization information and an image pickup apparatus having the same.

Description of the Related Art

It is known that a predetermined feature of an object can be emphasized to be detected by observing a polarization state of light from the object. For example, by attaching a polarization filter (polarization plate) in front of a lens of a camera to capture an image, a texture such as a color or a contrast of the object can be emphasized or reflected light from water surface or the like can be emphasized or reduced. Furthermore, there is an inspection apparatus which detects an edge or a defect portion of an object by capturing images with different polarization directions.

As a method of acquiring an image containing polarization information, there is a method of rotating a polarization plate, but a manual operation by a user or a complicated mechanism to rotate the polarization plate is necessary. In this respect, Japanese Patent Laid-open No. 2012-80065 discloses a wire grid polarization plate through which different polarized lights for each of a plurality of pixels on a solid-state image pickup element transmit and the image pickup element which extracts polarization information from the plurality of pixels. In this configuration, a plurality of pieces of polarization information can be acquired without rotating the polarization plate. United States Patent Application Publication No. 2009/0079982 discloses a λ/4 plate, two liquid crystal wavelength plates, and a polarization plate, and it also discloses a method of acquiring a plurality of images while changing a fast axis of the wavelength plate without rotating the polarization plate.

In Japanese Patent Laid-open No. 2012-80065, the polarization information can be obtained from a single image, but resolution or color information is lost since the plurality of pixels are allocated to acquire the polarization information. In United States Patent Application Publication No. 2009/0079982, the two liquid crystal wavelength plate are necessary, and accordingly control is complicated and the cost is increased.

SUMMARY OF THE INVENTION

The present invention provides an optical apparatus and an image pickup apparatus which are capable of acquiring polarization information with a simple configuration without rotating a polarization plate while acquiring a high-quality image.

An optical apparatus as one aspect of the present invention guides light from an object to an image pickup element, and the optical apparatus includes a first phase plate configured to give a fixed relative phase difference by π/2 between a polarization component in a slow axis direction and a polarization component in a fast axis direction, a second phase plate configured to give a relative phase difference between a polarization component in a slow axis direction and a polarization component in a fast axis direction, a polarizer configured to extract a polarization component to be guided to the image pickup element, and a setter configured to set the relative phase difference of the second phase plate, the first phase plate, the second phase plate, and the polarizer are disposed in order from an object side to an image pickup element side, the slow axis direction of the second phase plate is inclined with respect to each of the slow axis direction and the fast axis direction of the first phase plate, and the setter is configured to set the relative phase difference of the second phase plate depending on the polarization component of the light from the object guided to the image pickup element.

An image pickup apparatus as another aspect of the present invention includes the optical apparatus and an image pickup element configured to receive light from the optical apparatus.

Further features and aspects of the present invention will become apparent from the following description of exemplary embodiments with reference to the attached drawings.

BRIEF DESCRIPTION OF THE DRAWINGS

FIGS. 3A to 3D are diagrams of illustrating a transmittance dependency of a polarization acquirer with respect to the polarization direction of the incident light in Embodiment 1.

FIGS. 4A to 4D are diagrams of illustrating a transmittance dependency of the polarization acquirer with respect to a phase difference given by a variable phase plate in Embodiment 1.

DESCRIPTION OF THE EMBODIMENTS

Exemplary embodiments of the present invention will be described below with reference to the accompanied drawings.

Embodiment 1

Figure 1:
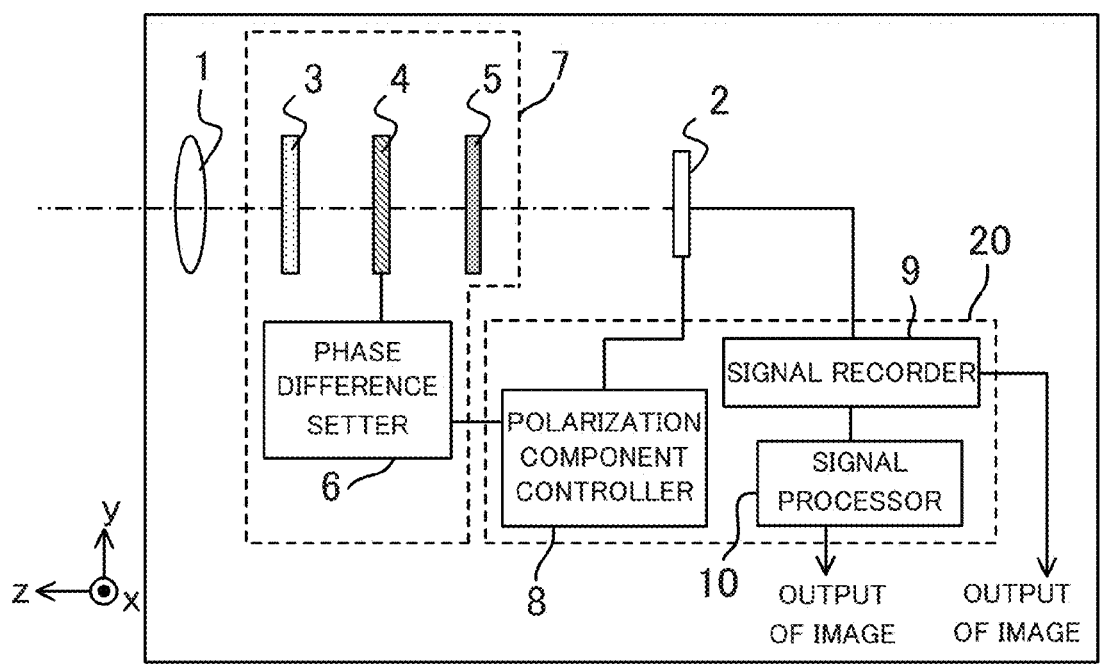
FIG. 1 is a schematic diagram of an image pickup apparatus in Embodiment 1 of the present invention.

FIG. 1 is a schematic diagram of illustrating a simple configuration of an image pickup apparatus 100 in Embodiment 1. In this embodiment, a z direction indicates an optical axis direction, and x and y directions represent directions orthogonal to the z direction in a plane.

The image pickup apparatus 100 includes an image pickup element 2 (photoelectric conversion element such as a CCD image sensor and a CMOS image sensor) which acquires image information of an object and a lens unit 1 which forms an image of the object on the image pickup element 2, and a polarization acquirer 7 (optical apparatus) is disposed on an optical path between the lens unit 1 and the image pickup element 2. The polarization acquirer 7 includes a λ/4 plate 3 (wavelength plate, or first phase plate), a variable phase plate 4 (second phase plate), and a polarization plate 5 (polarizer) which are disposed adjacent to each other in order from an object side to an image pickup element side.

The λ/4 plate 3 gives a relative phase difference (fixed relative phase difference) by π/2 between polarization components of incident light orthogonal to each other. In this embodiment, the λ/4 plate 3 is used, and alternatively a 3λ/4 plate or the like may be used if the relative phase difference by π/2 is given. Instead, a stretched film or a variable phase plate may be used.

Figure 6:
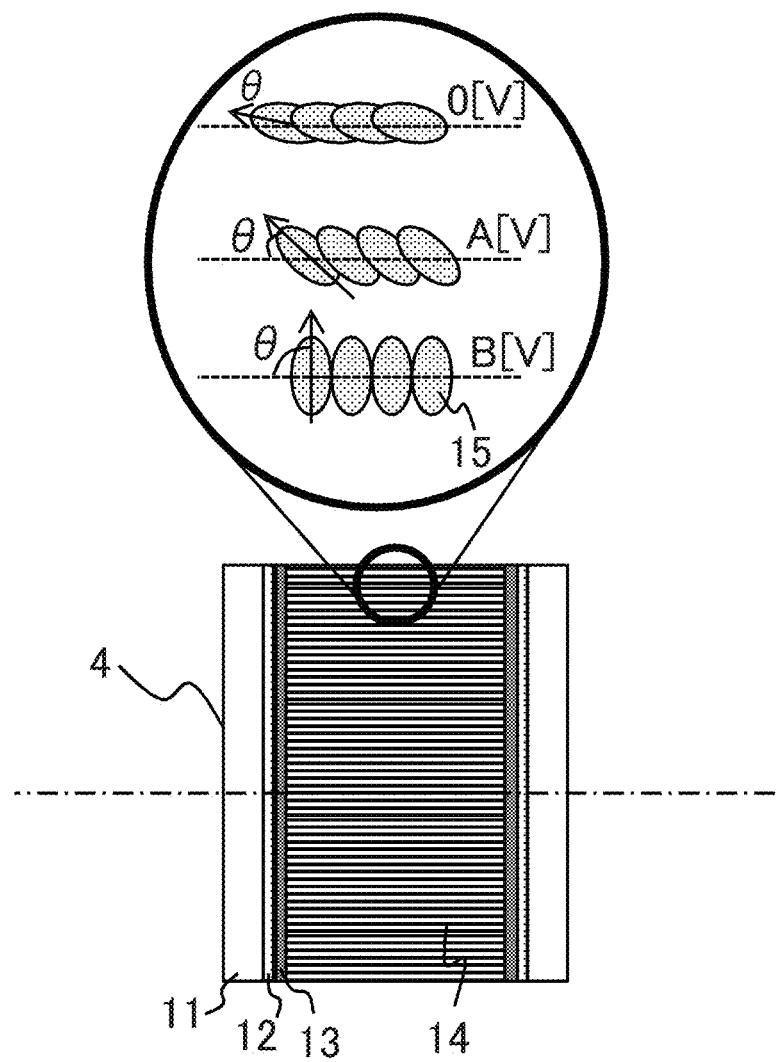
FIG. 6 is a configuration diagram of the variable phase plate in Embodiment 1.

The variable phase plate 4, similarly to the λ/4 plate 3, gives the relative phase difference between the polarization components of the incident light orthogonal to each other, and additionally it can change the relative phase difference (hereinafter, referred to as a phase difference of the variable phase plate 4) to be given to the polarization components, that is, the phase difference of the variable phase plate 4 is variable. In this embodiment, as the variable phase plate 4, an element using a liquid crystal is used. FIG. 6 illustrates a schematic diagram of the variable phase plate 4 using the liquid crystal.

The variable phase plate 4 has a structure of sandwiching a liquid crystal layer 14 by substrates 11, electrode layers 12, and alignment films 13. The liquid crystal layer 14 is aligned so that liquid crystal molecules 15 are aligned to follow the alignment films 13, and it changes a tilt angle θ of the liquid crystal according to a voltage applied to the electrode layers 12. A circle portion in FIG. 6 illustrates an enlarged view of the liquid layer 14, and in this example, the liquid crystal molecules 15 are aligned to be approximately perpendicular to a plate surface when the applied voltage is equal to 0 [V]. The tilt angle θ of the liquid crystal molecules is changed by changing the applied voltage from 0 [V] to A [V] or B [V] (A<B). An amount of the phase difference of the variable phase plate 4 changes depending on an incident angle of a light ray and an angle (tilt angle θ) of an optical axis of a refractive index anisotropy of the liquid crystal molecules. The variable phase plate as described above is an example of the present invention, and accordingly various configurations, instead of the configuration of FIG. 6, may be used as the variable phase plate 4. For example, a liquid crystal device having a different drive method of changing an alignment direction instead of the tilt angle of the liquid crystal may be used. A method of using a change of a refractive index caused by an electro-optic effect, a method of controlling a grating height of a structure birefringence by a fine structure or its interval precisely, or a combination of them may be adopted. The variable phase plate of the present invention may be configured to generate different phase differences in different regions on the phase plate surface, instead of changing the phase difference uniformly on the plate surface.

A phase difference setter 6 (setter) sets (changes) the phase difference of the variable phase plate 4 according to a signal (instruction) from the image pickup apparatus 100. The variable phase plate 4 gives a phase difference to transmitted light according to a voltage applied by the phase difference setter 6.

A polarization plate 5 causes a component in a transmission axis direction (transmission polarization direction) of the polarization components of the incident light to transmit. Since a polarization acquirer 7 is used in the image pickup apparatus 100, it is preferred that an absorption type polarization plate that absorbs unnecessary light is used as the polarization plate 5. If a polarization plate such as a wire grid polarizer is used, polarized light which needs to be cut is reflected and the light becomes stray light or ghost which causes a negative impact on an image, and accordingly it is not preferable as a configuration of the image pickup apparatus. More preferably, in order to suppress the influence on the ghost, the polarization plate has characteristics of absorbing at least 50% of polarized light which oscillates in a direction orthogonal to the transmission axis. For example, a film stretching an iodine compound may be used as the polarization plate, but this embodiment is not limited to such a material and an arbitrary absorption type polarization plate may be used.

The image pickup apparatus 100 includes a control apparatus 20 including a microcomputer or the like, and the control apparatus 20 includes a polarization component controller 8, a signal recorder 9, and a signal processor 10.

The polarization component controller 8 is synchronous with the image pickup element 2, and it sends a control signal of the phase difference of the variable phase plate 4 to the phase difference setter 6. According to this control, the polarization component of light from an object which is received by the image pickup element 2 changes, and an image containing polarization information of the object can be acquired. Details of the relationship between the phase difference of the variable phase plate 4 and the polarization state of the acquired image will be described below.

When photographing an object, the image pickup apparatus 100 captures a plurality of images at the same time while changing the phase difference of the variable phase plate 4 temporally. The signal recorder 9 temporarily stores the images obtained by the image pickup element 2 or the like in a recording medium such as a RAM (not illustrated). The stored images may be directly output as a plurality of images, or predetermined processing may be performed by the signal processor 10 to be output as a single image or a plurality of images. When the plurality of images are directly output, image processing is further performed on the plurality of images by using an external processing apparatus such as a PC (personal computer) to obtain images which need more complicated calculation or the like. If the signal processor 10 performs processing of extracting a predetermined feature amount, a desired image can be obtained at a high speed.

Using these configuration members, the image pickup apparatus 100 captures the images while the transmission axis direction of the polarization plate 5 is fixed and the phase difference of the variable phase plate 4 changes to acquire the plurality of images with different polarization states. Details will be described below.

Figure 2A:
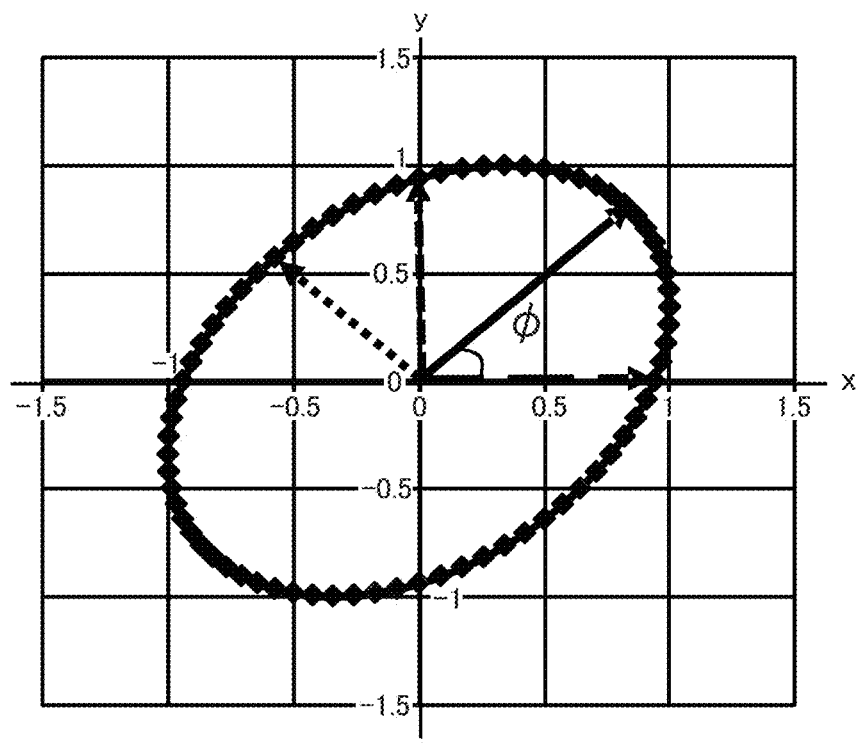
FIGS. 2A and 2B are diagrams of illustrating orientation dependency of a polarization state and an intensity of incident light in Embodiment 1.
Figure 2B:
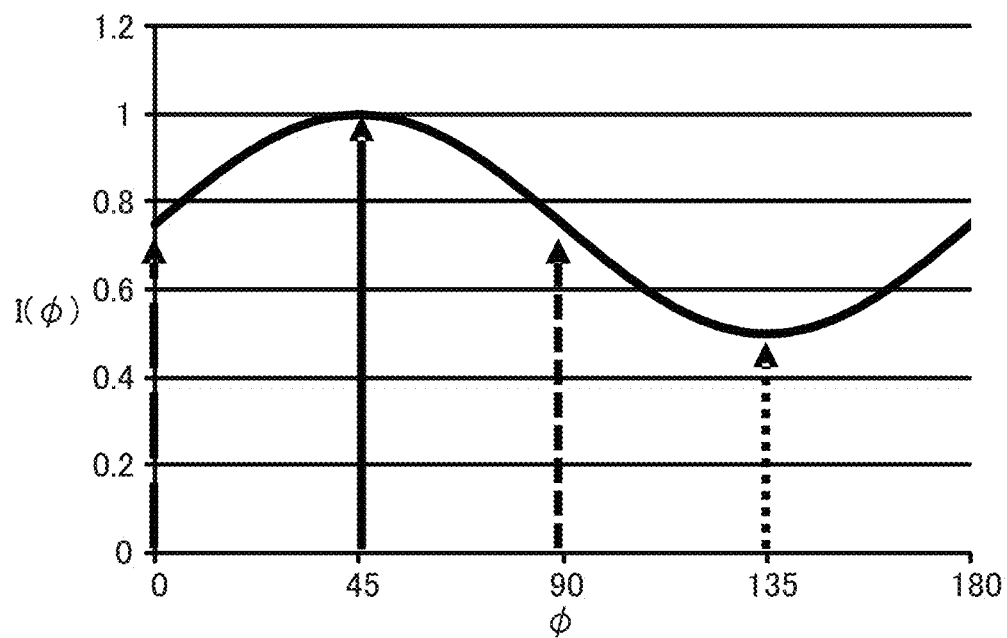

First, an orientation dependency of a light intensity from a typical object will be described. An ellipse indicated by a thick dotted line in FIG. 2A illustrates an exemplary orientation dependency of an amplitude of a polarization state. An angle between an x axis direction and a polarization direction is denoted by φ. FIG. 2B is a graph in which a horizontal axis indicates the angle φ and a vertical axis indicates a light intensity I(φ). A square of a radius of the ellipse illustrated in FIG. 2A corresponds to the light intensity I(φ), and it is plotted in FIG. 2B. Arrows with different line types illustrated in FIG. 2A correspond to arrows with respective line types illustrated in FIG. 2B. In this example, the intensity of the polarization component having the angle φ of 45 degrees is maximized. Accordingly, by extracting the polarization component having the angle φ of 45 degrees or 135 degrees orthogonal to 45 degrees, an image in which a feature of an object is emphasized most can be acquired.

Next, referring to FIGS. 3A to 3D, a case in which the transmission axis direction of the polarization plate 5 is fixed and the phase difference given to the incident light by the variable phase plate 4 is set to be constant will be described. Dashed line arrows on the λ/4 plate 3 and the variable phase plate 4 indicate a slow axis direction, and a dashed line on the polarization plate 5 indicates a transmission axis direction. In other words, the slow axis direction of the λ/4 plate 3 and the transmission axis direction of the polarization plate 5 are (approximately) parallel to a y direction.

When an angle with respect to the x axis direction is denoted by $\varphi$, each of the slow axis direction of the λ/4 plate 3 and the transmission axis direction of the polarization plate 5 satisfies $\varphi=90$ degrees, and the slow axis direction of the variable phase plate 4 satisfies $\varphi=45$ degrees (i.e., the slow axis direction is approximately 45 degrees counterclockwise from the transmission axis direction). In each of FIGS. 3A to 3D, the phase difference of the variable phase plate 4 is set to λ/4. A direction and a length of arrows before and after transmitting through the polarization acquirer 7 indicate a polarization orientation and an intensity, respectively.

FIG. 3A illustrates a case in which the polarization direction of the incident light satisfies $\varphi=90$ degrees. In this case, the incident light transmits through the λ/4 plate 3 without a phase change since its polarization direction is parallel to the slow axis direction of the λ/4 plate 3. Light transmitted through the λ/4 plate 3 is converted into right circularly polarized light by the variable phase plate 4, and accordingly, by transmitting through the polarization plate 5, it is linearly polarized light with an intensity of 50% compared to the incident light.

FIG. 3B illustrates a case in which the polarization direction of the incident light satisfies $\varphi=45$ degrees. In this case, the incident light is converted into left circularly polarized light by the λ/4 plate 3. Light transmitted through the λ/4 plate 3 is converted into linearly polarized light having a polarization direction satisfying $\varphi=90$ degrees by the variable phase plate 4 and it is parallel to the transmission axis direction of the polarization plate 5, and accordingly it transmits through the polarization plate 5 without substantial loss.

FIG. 3C illustrates a case in which the polarization direction of the incident light satisfies $\varphi=0$ degree. In this case, the incident light transmits through the λ/4 plate 3 without a phase change since its polarization direction is orthogonal to the slow axis direction of the λ/4 plate 3. Light transmitted through the λ/4 plate 3 is converted into left circularly polarized light by the variable phase plate 4, and accordingly, by transmitting through the polarization plate 5, it is linearly polarized light with an intensity of 50% compared to the incident light.

FIG. 3D illustrates a case in which the polarization direction of the incident light satisfies $\varphi=135$ degrees. In this case, the incident light is converted into right circularly polarized light by the λ/4 plate 3. Light transmitted through the λ/4 plate 3 is converted into linearly polarized light having a polarization direction satisfying $\varphi=0$ degree by the variable phase plate 4 and it is orthogonal to the transmission axis direction of the polarization plate 5, and accordingly it is blocked without substantially transmitting through the polarization plate 5.

As described above, when the phase difference given by the variable phase plate 4 is λ/4, it can be understood that the transmittance is highest on condition that the polarization direction of the incident light to the polarization acquirer 7 satisfies $\varphi=45$ degrees. Hereinafter, an angle between a direction of a component with a maximum transmittance of the polarization components of the incident light to the polarization acquirer 7 and the x axis direction is denoted by $\varphi o$.

In this embodiment, by changing the phase difference of the variable phase plate 4 by electric control, the image pickup apparatus 100 changes the angle $\varphi o$ of the component with the maximum transmittance of the polarization components of the incident light. Accordingly, while the transmission axis of the polarization plate 5 is fixed, the polarization information on the plurality of polarization components can be acquired.

Figure 5:
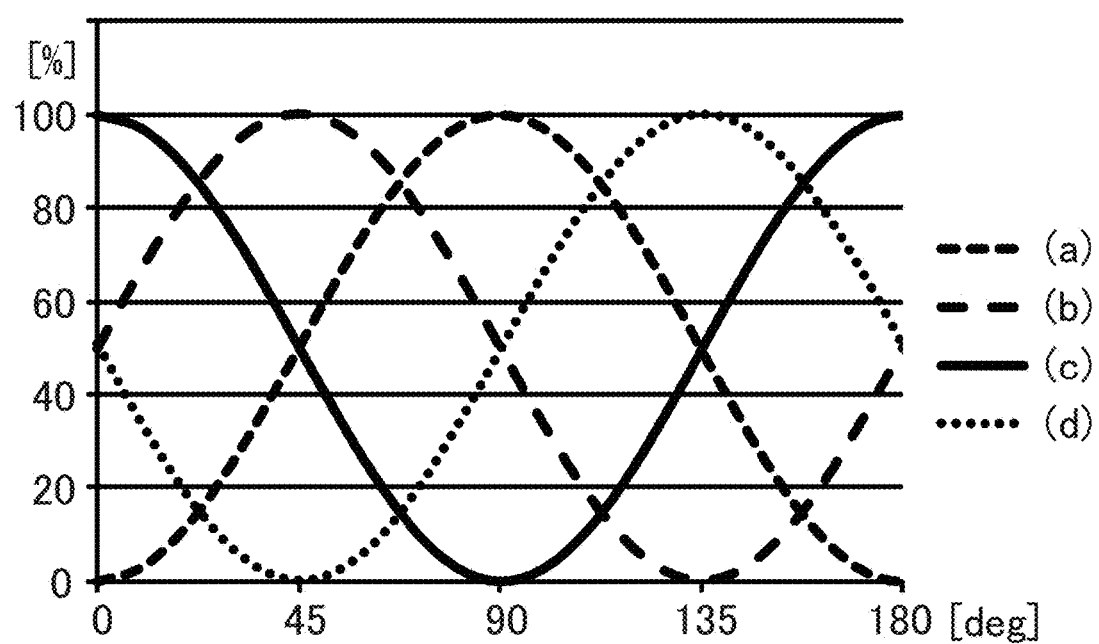
FIG. 5 is a diagram of illustrating the phase difference given by the variable phase plate and the transmittance dependency of the polarization acquirer with respect to the polarization component of the incident light in Embodiment 1.

FIG. 5 illustrates a relationship between the direction (angle $\varphi$) of the polarization component of the incident light and a transmittance $T(\varphi)$ of the polarization acquirer 7 for each phase difference of the variable phase plate 4. A difference of line types indicates a difference of the phase difference of the variable phase plate 4, and lines (a), (b), (c), and (d) indicate cases in which the phase differences are set to 0, λ/4, λ/2, and 3λ/4, respectively. For example, with respect to the dashed line (a), the transmittance $T(\varphi)$ is 100% and the angle $\varphi o$ is 90 degrees on condition that the angle $\varphi$ satisfies $\varphi=90$ degrees when the phase difference of the variable phase plate 4 is 0.

FIGS. 4A to 4D illustrate changes of states of the component in which the polarization direction is $\varphi o$ of the incident light to the polarization acquirer 7 for the respective phase differences of the variable phase plate 4. Dashed line arrows on the λ/4 plate 3 and the variable phase plate 4 indicate the slow axis direction, and a dashed line arrow on the polarization plate 5 indicates a polarization transmission axis direction.

In FIG. 4A, the phase difference of the variable phase plate 4 is set to 0, and the angle $\varphi o$ is 90 degrees. In FIG. 4B, the phase difference of the variable phase plate 4 is set to λ/4, and the angle $\varphi o$ is 45 degrees. In FIG. 4C, the phase difference of the variable phase plate 4 is set to λ/2, and the angle $\varphi o$ is 0 degree. In FIG. 4D, the phase difference of the variable phase plate 4 is set to 3λ/4, and the angle $\varphi o$ is 135 degrees.

In other words, in any states in FIGS. 4A to 4D, when the incident light transmits through the λ/4 plate 3 and the variable phase plate 4, a desired polarization component of the incident light becomes linearly polarized light which is parallel to the transmittance axis direction of the polarization plate 5, and it transmits through the polarization plate 5 without substantial loss. Further, the polarization acquirer 7 rotates a direction of the desired polarization component of the polarization components of the incident light to the transmission axis direction of the polarization plate 5, and it guides the desired polarization component to the image pickup element without substantial loss. Thus, by acquiring an image while the phase difference of the variable phase plate 4 is changed by using the above configuration, polarization information substantially equal to that obtained when rotating the transmission axis direction of the polarization plate 5 can be obtained.

The polarization acquirer 7 is disposed so that each of an angle between the slow axes of the λ/4 plate 3 and the variable phase plate 4 and an angle of the slow axis of the variable phase plate 4 and the transmission axis of the polarization plate 5 is 45 degrees, and thus the influence on the phase information contained in the incident light is minimized. For example, when a complete circularly polarized light enters, it becomes linearly polarized light with an angle of 45 degrees as an orientation parallel to the slow axis of the variable phase plate 4 by the λ/4 plate 3, and the transmittance of the polarization acquirer 7 is constant independently of the phase difference of the variable phase plate 4. For a case of elliptically polarized light, a value according to an orientation dependency of the intensity of the polarized incident light is obtained, and accordingly information on the intensity can be acquired.

In this embodiment, in order to obtain the polarization component in which the intensity of the incident light is maximized, the control apparatus 20 treats an input value from the image pickup element 2 as the intensity of the polarization component to analyze the orientation dependency of the intensity of the polarized incident light by using an appropriate function (for example, Sin function). In this embodiment, when the intensity of the polarization component with the orientation φi of the incident light is I(φ$_i$), the phase difference of the variable phase plate 4 is Δj, the transmittance of the polarization acquirer 7 at the phase difference Δj with respect to the intensity I(φ$_i$) is T$_{ij}$, and the intensity of transmitted light of all polarized components of the incident light at the phase difference Δj, the following determinant represented by expression (1) is satisfied.

$$[T_j] = [T_{ij}] * [I(\varphi_i)] \quad (1)$$

A subscript "j" of T$_j$ corresponds to the phase difference Δj, and it can be considered that each of the phase difference Δj corresponds to the polarization component in one direction of the incident light. The transmittance T$_{ij}$ can be obtained uniquely if an oscillation direction of the linearly polarized incident light and the configuration of the polarization acquirer 7 are determined. Accordingly, the control apparatus 20 acquires the transmittance T$_{ij}$ in advance, and it analyzes the intensity T$_j$ of the acquirable transmitted light while changing the phase difference Δj as a plot of the intensity of the transmitted light with respect to the oscillation direction of the polarization component of the incident light to obtain the orientation dependency of the intensity of the incident light.

As described above, in this embodiment, the λ/4 plate 3, the variable phase plate 4, and the polarization plate 5 are disposed in order from the object side to the image pickup element side, the slow axis direction of the variable phase plate 4 is inclined with respect to each of the slow axis direction and the fast axis direction of the λ/4 plate 3, and the phase difference setter 6 is configured to set the relative phase difference of the variable phase plate 4 depending on the polarization component of the light from the object guided to the image pickup element 2. By this configuration, the information of the orientation dependency of the light intensity can be acquired by using a single variable phase plate while the polarization plate 5 is fixed.

Next, the above configuration will be described by using detail data.

In this embodiment, with respect to the phase difference of the λ/4 plate 3 or the variable phase plate 4, a wavelength λ is a wavelength of 550 nm that has a high visibility. Table 1 represents a transmittance for each linearly polarized light which has a different oscillation direction for each phase difference of the variable phase plate 4 in the image pickup apparatus 100, i.e., a matrix [T$_{ij}$] in expression (1). Symbol φi in Table 1 represents an angle of the oscillation direction of the polarized incident light with respect to the x direction. The direction (angle φo) of the maximum transmittance for each phase difference Δ of the variable phase plate 4 is indicated at the bottom line in Table 1. For example, the polarization states of the light transmitted through the variable phase plate 4 for Δ=λ/4 are as illustrated in FIGS. 3A to 3D. Therefore, the highest transmittance is obtained at φi=45 degrees, and the minimum transmittance is obtained at φi=135 degrees orthogonal to 45 degrees. The relationship between the orientation (angle φo [degree]) at the wavelength of 550 nm and the phase difference Δ [degree] can be represented as φ=−Δ+90 [degree]. For other wavelengths, the value of the orientation (angle φo) changes depending on a wavelength dispersion of the variable phase plate 4. If characteristics of the dispersion of the variable phase plate 4 are known, the value of the orientation (angle φo) can be obtained for arbitrary wavelengths.

Next, a method of estimating the orientation dependency of the intensity of the polarized incident light will be described as an example of a case in which the light of the polarization component illustrated in FIGS. 2A and 2B is incident. First, as can be seen in FIG. 2B, the intensities of the polarized lights for the respective orientation φ are read as I(0)=0.75, I(45)=1.0, I(90)=0.75, and I(135)=0.5. According to expression (1), by multiplying the intensity [I(φ$_j$)] of each of the four polarized incident lights by the transmittance [T$_{ij}$] in Table 1, [T$_j$] is obtained as T(j=0,Δ=0)=1.500, T(j=1,Δ=λ/4)=1.746, T(j=2,Δ=λ/2)=1.500, and T(j=3,Δ=3λ/4)=1.250. By normalizing them with the maximum value, T'(j=0)=0.859, T'(j=1)=1.000, T'(j=2)=0.861, and T'(j=3)=0.716.

Figure 7A:
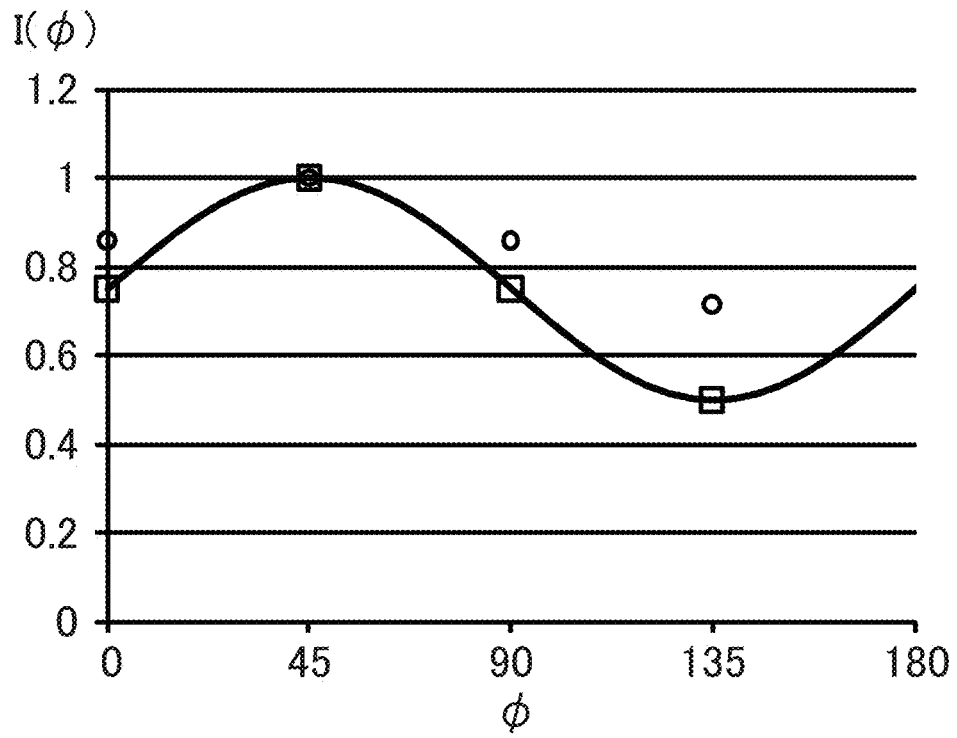
FIGS. 7A and 7B are comparative diagrams of an intensity dependency of a polarization component of the polarization acquirer in Embodiment 1.
Figure 7B:
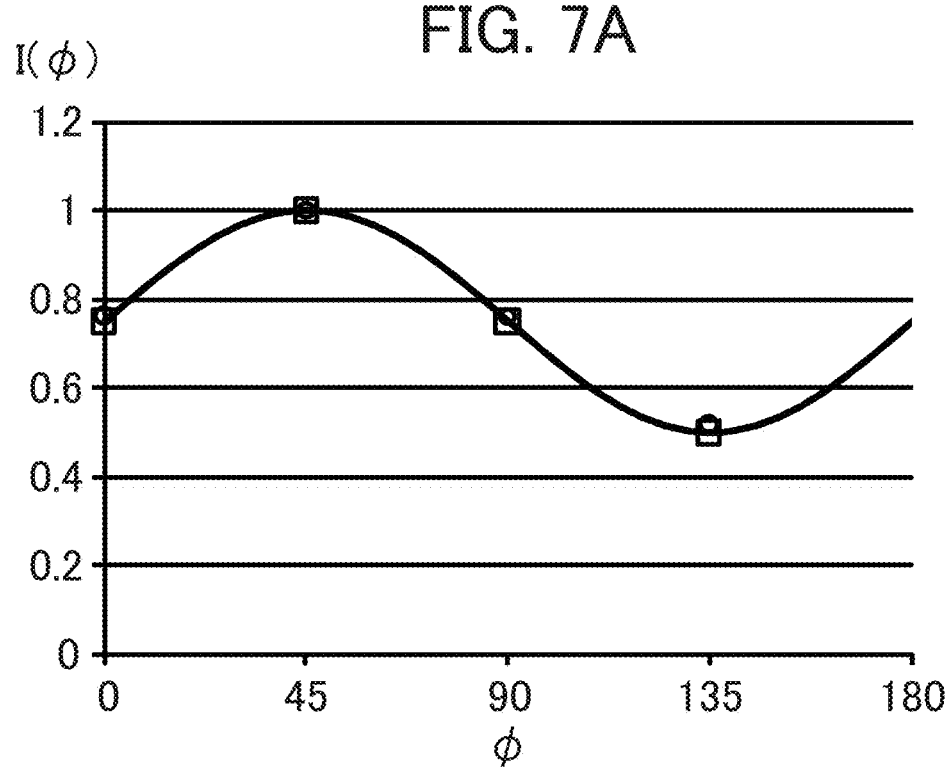

Maximum transmission orientations φo for j=0, 1, 2, and 3 are 90, 45, 0, and 135 degrees, respectively, and accordingly a graph in which j is replaced with φo and a normalized intensity T' (φo) of the transmitted light is plotted on the intensity I(φ) of the polarized incident light is illustrated in FIG. 7A. Plots of symbol "□" indicate light intensities obtained when the transmission axis direction of the polarization plate is φo, and plots of symbol "o" indicate light intensities obtained by the polarization acquirer 7. According to the data, the orientation of the polarization component in which the light intensity is maximized can be obtained as 45 degrees based on fitting of A, B, and δ in I(φ)=A+B*Sin (φ+δ) by using a least square method or the like. However, the plots "o" contain a lot of offsets compared to the intensity of the polarized incident light. The offsets are caused by a decrease of an extinction ratio in the process of acquiring the polarization information, and for example it can be simply canceled to some extent by subtracting a minimum value of the normalized transmittance T' from T(φ) and then normalizing it again. FIG. 7B illustrates a graph which is similar to that of FIG. 7A after this process is performed. Each plot in the drawing conforms to that in FIG. 7A. As can be seen in FIG. 7B, data in which plots of the incident intensities are reflected, compared to data in FIG. 7A, are obtained.

TABLE 1

|  | Δ = 0 | Δ = λ/4 | Δ = λ/2 | Δ = 3λ/4 |
| --- | --- | --- | --- | --- |
| φi = 0 | 0.0000 | 0.4971 | 1.0000 | 0.5086 |
| φi = 45 | 0.5000 | 1.0000 | 0.5057 | 0.0001 |
| φi = 90 | 1.0000 | 0.4971 | 0.0000 | 0.4914 |
| φi = 135 | 0.5000 | 0.0000 | 0.4943 | 1.0000 |
| MAXIMUM TRANSMISSION ORIENTATION | φ = 90 | φ = 45 | φ = 0 | φ = 135 |

In the above explanation, the values set as the phase difference of the variable phase plate 4 are four values of 0 to 3λ/4 at intervals of λ/4, and a single value, two or three values may be adopted according to the acquired polarization information. For example, when the polarization information is acquired once while the image pickup apparatus is fixed or the orientations of the maximum and minimum intensities of the polarization dependency are known to some extent, an image containing necessary polarization information may be obtained by using a single value since the image in a specific state only has to be captured. For easiness of analysis, however, it is preferred that the image capturing is performed so that the phase difference of the variable phase plate is set to an integral multiple of λ/4.

While this embodiment describes the case in which the slow axis direction of the λ/4 plate 3 is disposed to be parallel to the y direction of the transmission axis direction of the polarization plate 5, instead, the fast axis direction of the λ/4 plate 3 may be disposed to be parallel to the y direction of the transmission axis direction of the polarization plate 5. In this case, the same action occurs by setting the fast axis direction of the variable phase plate 4 to satisfy φ=45 degrees (i.e., the slow axis direction is 45 degrees clockwise from the transmission axis direction of the polarization plate 5).

In this embodiment, while each of the images obtained by the image pickup apparatus 100 contain different polarization information, it can be used directly without performing calculation processing such as image processing. However, by performing the calculation processing on the images containing the different polarization information, images in which the feature of the object is more emphasized for each pixel unit can be obtained.

For example, by generating an image only with smallest values of the light intensity in the acquired data or by generating an image only with largest values of the light intensity, the image in which a scattered light component of the object is emphasized or the image in which a regular reflection component from the object is emphasized can be obtained. The value of the light intensity of the polarized light may be a value of an image directly obtained by the polarization acquirer 7, or alternatively a value of interpolation or extrapolation obtained by a polarization analysis may be used. The interpolation or extrapolation means using an estimated value based on an analysis result so that a difference of the intensities of the obtained polarization components is emphasized or suppressed.

As described above, by acquiring object information (information of the object) optically, the image in which a feature amount of the object is emphasized or suppressed can be obtained. Furthermore, by a combination of them, an image which is intended by a user can be generated. In addition, an image containing different polarization information for each region in the image or containing an emphasis effect may be generated. For example, by combining images with different polarization states for a main object and a background (for example, a sky), an effect of equalizing colors in the background or an effect of acquiring an image in which each of the background and the main object is emphasized can be obtained. In addition, by performing various processing by using the intensity dependency of the polarized light for the object, an intended image can be obtained.

Embodiment 2

Embodiment 2 will describe a case in which an influence by disposing an optical low-pass filter and the like is considered. Descriptions of configurations common to those in Embodiment 1 will be omitted.

Typically, in an image pickup apparatus such as a digital single-lens reflex camera, an optical low-pass filter is disposed near an image pickup element to prevent a moire or a false color. If the optical low-pass filter is disposed in front of the image pickup element or the polarization dependency exists in an autofocus unit even when the configuration described in Embodiment 1 is used, polarization information of an object cannot be correctly acquired in some cases. Furthermore, if the polarization acquirer 7 is disposed simply between the optical low-pass filter and a lens, a desired effect as an optical low-pass filter cannot be obtained in some cases due to the influence of the polarization acquirer 7.

Figure 8:
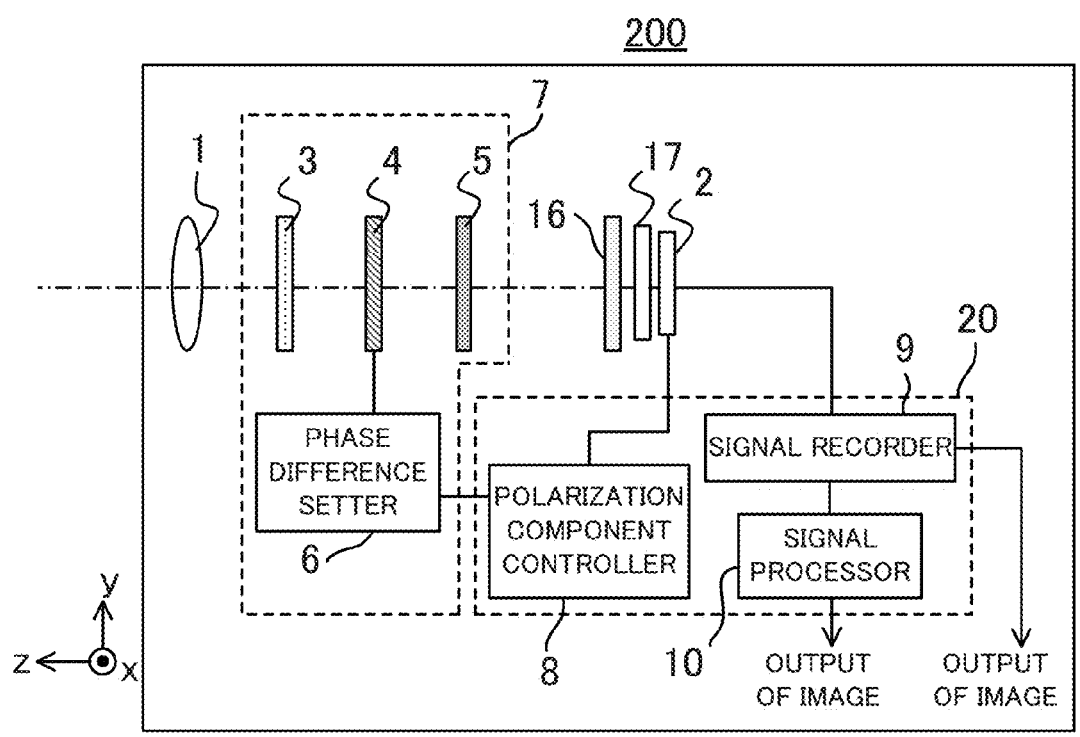
FIG. 8 is a schematic diagram of an image pickup apparatus in Embodiment 2 of the present invention.

FIG. 8 illustrates a schematic diagram of an image pickup apparatus 200 including an optical low-pass filter 17. As the optical low-pass filter 17, an element in which a plurality of birefringent media are laminated or an element using polarization characteristics such as a polarization diffraction element is used.

For the harmful effect which occurs when the low-pass filter or the like as described above, in this embodiment, an achromatic λ/4 plate 16 (achromatic phase plate, or third phase plate) is inserted between the polarization plate 5 and the optical low-pass filter 17 to covert light into circularly polarized light. A typical λ/4 plate can be inserted, but the λ/4 plate has characteristics of a wavelength dispersion and the circularly polarized light which is uniform over an entire visible light band cannot be obtained, and accordingly there is a possibility that a phase shift depending on a wavelength appears in an image as a change of a color. Therefore, as a λ/4 plate to be inserted, the achromatic λ/4 plate which is designed so that a phase difference is minimized in a visible wavelength band as a use wavelength is desired.

As other measures, an angle between a light separating direction of a layer of the optical low-pass filter 17 which is closest to the polarization acquirer 7 (if the optical low-pass filter has a laminated structure) and the transmission axis direction of the polarization plate 5 may be set to 45 degrees. Also in this case, the characteristics of the optical low-pass filter 17 and the characteristics of the polarization acquirer 7 are compatible. While any measures may be used, the latter is a simpler measure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-022960, filed Feb. 9, 2015, which is hereby incorporated by reference herein in its entirety.

What is claimed is:

1. An optical apparatus which guides light from an object to an image pickup element, the optical apparatus comprising:
    a first phase plate configured to give a fixed relative phase difference by $\pi/2$ between a polarization component in a slow axis direction of the first phase plate and a polarization component in a fast axis direction of the first phase plate;
    a second phase plate configured to give a variable relative phase difference between a polarization component in a slow axis direction of the second phase plate and a polarization component in a fast axis direction of the second phase plate;
    a polarizer configured to guide a polarization component in a transmission polarization direction of the polarizer to the image pickup element; and
    a setter configured to set the relative phase difference of the second phase plate,
    wherein the first phase plate, the second phase plate, and the polarizer are disposed in order from an object side to an image pickup element side, and wherein the slow axis direction of the second phase plate is inclined with respect to each of the slow axis direction and the fast axis direction of the first phase plate.

2. The optical apparatus according to claim 1, wherein the slow axis direction of the second phase plate is inclined by approximately 45 degrees with respect to the transmission polarization direction of the polarizer.

3. The optical apparatus according to claim 1, wherein the slow axis direction or the fast axis direction of the first phase plate is approximately parallel to the transmission polarization direction of the polarizer.

4. The optical apparatus according to claim 3, wherein when the slow axis direction of the first phase plate is set approximately in parallel to the transmission polarization direction of the polarizer, the slow axis direction of the second phase plate is set to be inclined by approximately 45 degrees counterclockwise from the transmission polarization direction of the polarizer when viewed from the image pickup element side.

5. The optical apparatus according to claim 3, wherein when the fast axis direction of the first phase plate is set approximately in parallel to the transmission polarization direction of the polarizer, the slow axis direction of the second phase plate is set to be inclined by approximately 45 degrees clockwise from the transmission polarization direction of the polarizer when viewed from the image pickup element side.

6. The optical apparatus according to claim 1, wherein the setter is configured to set the relative phase difference of the second phase plate so that the polarization component to be guided to the image pickup element is in a polarization direction approximately parallel to the transmission polarization direction of the polarizer after transmitting through the second phase plate.

7. The optical apparatus according to claim 1, wherein the second phase plate is a single phase plate, and wherein the first phase plate, the second phase plate, and the polarizer are disposed adjacent to each other.

8. The optical apparatus according to claim 1, wherein the second phase plate is a phase plate using a liquid crystal, and wherein the setter is configured to set a voltage to be applied to the second phase plate.

9. The optical apparatus according to claim 1, wherein the setter is configured to set the relative phase difference of the second phase plate to an integral multiple of $\lambda/4$.

10. The optical apparatus according to claim 1, further comprising an optical low-pass filter including a plurality of layers which is disposed between the image pickup element and the polarizer,
wherein a light separating direction caused by a layer, which is closest to the polarizer, of the optical low-pass filter is inclined by approximately 45 degrees with respect to the transmission polarization direction of the polarizer.

11. The optical apparatus according to claim 10, wherein the optical low-pass filter uses birefringence or a polarization diffraction element.

12. The optical apparatus according to claim 1, further comprising:
an optical low-pass filter disposed between the image pickup element and the polarizer; and
a third phase plate configured to give a relative phase difference by $\pi/2$ between polarization components of a slow axis direction and a fast axis direction of the third phase plate, the third phase plate being disposed between the optical low-pass filter and the polarizer,
wherein the slow axis direction or the fast axis direction of the third phase plate is inclined by approximately 45 degrees with respect to the transmission polarization direction of the polarizer.

13. The optical apparatus according to claim 12, wherein at least one of the first phase plate and the third phase plate is an achromatic phase plate.

14. The optical apparatus according to claim 1, wherein the polarizer is configured to absorb at least 50% of a polarization component in a direction orthogonal to the transmission polarization direction in a visible wavelength band.

15. An image pickup apparatus comprising:
the optical apparatus according to claim 1; and
an image pickup element configured to receive light from the optical apparatus.

16. The image pickup apparatus according to claim 15, further comprising a controller configured to control the setter and the image pickup element,
wherein the controller is configured to acquire an image by using the image pickup element for each relative phase difference of the second phase plate and acquire polarization information of the object from the acquired image.

* * * * *